US012315458B2

(12) United States Patent
Liu et al.

(10) Patent No.: US 12,315,458 B2
(45) Date of Patent: May 27, 2025

(54) GATE DRIVINGS MODULE AND DISPLAY PANELS

(71) Applicant: WUHAN CHINA STAR OPTOELECTRONICS SEMICONDUCTOR DISPLAY TECHNOLOGY CO., LTD., Wuhan (CN)

(72) Inventors: Yi Liu, Wuhan (CN); Feixiang Sun, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/277,706

(22) PCT Filed: Jul. 20, 2023

(86) PCT No.: PCT/CN2023/108321
§ 371 (c)(1),
(2) Date: Aug. 17, 2023

(87) PCT Pub. No.: WO2024/250389
PCT Pub. Date: Dec. 12, 2024

(65) Prior Publication Data

US 2025/0029561 A1 Jan. 23, 2025

(30) Foreign Application Priority Data

Jun. 6, 2023 (CN) ........................... 20310669777.6

(51) Int. Cl.
*G09G 3/3266* (2016.01)
*G09G 3/3208* (2016.01)

(52) U.S. Cl.
CPC ..... *G09G 3/3266* (2013.01); *G09G 2330/023* (2013.01)

(58) Field of Classification Search
CPC ............... G09G 3/3266; G09G 3/3208; G09G 2310/0286; G11C 19/00; G11C 19/28
See application file for complete search history.

(56) References Cited

U.S. PATENT DOCUMENTS 10,636,356 B1 4/2020 Qian et al.
11,455,937 B2 * 9/2022 Seo ...................... G09G 3/2092
(Continued)

FOREIGN PATENT DOCUMENTS

CN 110517633 A 11/2019
CN 113421604 A 9/2021
(Continued)

OTHER PUBLICATIONS

PCT International Search Report for International Application No. PCT/CN2023/108321, mailed on Mar. 1, 2024, 11pp.
(Continued)

*Primary Examiner* — Sardis F Azongha
(74) *Attorney, Agent, or Firm* — The Roy Gross Law Firm, LLC; Roy D. Gross

(57) ABSTRACT

The present application provides a gate driving module and a display panel. The gate driving module includes a plurality of cascaded gate driving circuits and a frequency division control line electrically connected thereto (for transmitting a frequency division control signal). Each of the gate driving circuits includes a gate control unit for receiving a gate control signal generated by an upper stage of gate driving circuit, an output unit electrically connected to the gate control unit via a first node and a second node (for outputting the gate signal and transmitting it to a lower stage of gate driving circuit), and a frequency division control unit elec-
(Continued)

trically connected between the gate control unit and the output unit (for controlling a signal from one of the first node and the second node according to the frequency division control signal) to realize a frequency division function.

17 Claims, 6 Drawing Sheets

(56) References Cited

U.S. PATENT DOCUMENTS

| | | | | |
|---|---|---|---|---|
| 11,869,445 | B2 * | 1/2024 | Yoon | G09G 3/3266 |
| 11,996,026 | B1 * | 5/2024 | Kim | G11C 19/28 |

FOREIGN PATENT DOCUMENTS

| | | | |
|---|---|---|---|
| CN | 113593476 | A | 11/2021 |
| CN | 115731839 | A | 3/2023 |
| CN | 115798382 | A | 3/2023 |
| CN | 115985225 | A | 4/2023 |

OTHER PUBLICATIONS

PCT Written Opinion of the International Searching Authority for International Application No. PCT/CN2023/108321, mailed on Mar. 1, 2024, 7pp.

* cited by examiner

GATE DRIVINGS MODULE AND DISPLAY PANELS

CROSS REFERENCE TO RELATED APPLICATIONS

This application is a National Phase of PCT Patent Application No. PCT/CN2023/108321 having International filing date of Jul. 20, 2023, which claims the benefit of priority of Chinese Patent Application No. 202310669777.6, filed Jun. 6, 2023, the contents of which are all incorporated herein by reference in their entirety.

TECHNICAL FIELD

The present application relates to the field of display technologies, and more particularly to a gate driving module and a display panel.

BACKGROUND

An Organic Light Emitting Diode (OLED) display panel is widely used because of its feature such as flexibility.

A gate driving circuit in the OLED display panel generally outputs valid pulses stage by stage to sequentially turn on multiple rows of sub-pixels, and a refresh rate of an entire display area of the display panel is the same. Therefore, it is impossible to drive different areas with different refresh rates, resulting in limited use scenarios.

SUMMARY

The present application provides a gate driving module and a display panel to implement driving of the different areas with the different refresh rates.

The present application provides a gate driving module, including a frequency division control line and a plurality of cascaded gate driving circuits, where the frequency division control line is configured to transmit a frequency division control signal to the plurality of cascaded gate driving circuits, and each of the gate driving circuits includes:

- a gate control unit for receiving a gate control signal generated by an upper stage of gate driving circuit;
- an output unit electrically connected to the gate control unit via a first node and a second node and for outputting a current-stage gate control signal according to signals from the first node and the second node for transmission to a gate control unit in a lower stage of gate driving circuit; and
- a frequency division control unit electrically connected between the gate control unit and the output unit and for controlling a signal from one of the first node and the second node according to the frequency division control signal to control the output unit to output the current-stage gate control signal.

Beneficial Effects

The present application provides a gate driving module and a display panel. By disposing the frequency division control unit electrically connected between the gate control unit and the output unit and for controlling the signal from one of the first node and the second node according to the frequency division control signal to control the output unit to output the current-stage gate control signal, the plurality of gate control signals respectively generated by the plurality of gate driving circuits are controlled when the gate driving module is applied to the display panel to further control light emitting conditions of a plurality of rows of sub-pixels, so that the plurality of rows of sub-pixels are controlled in different frames to be in different light emitting conditions, resulting in different number of frames in a plurality of frames in which sub-pixels in different areas emit light or do not emit light. That is, driving of the display panel in a frequency division manner can be implemented.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION

Figure 1:
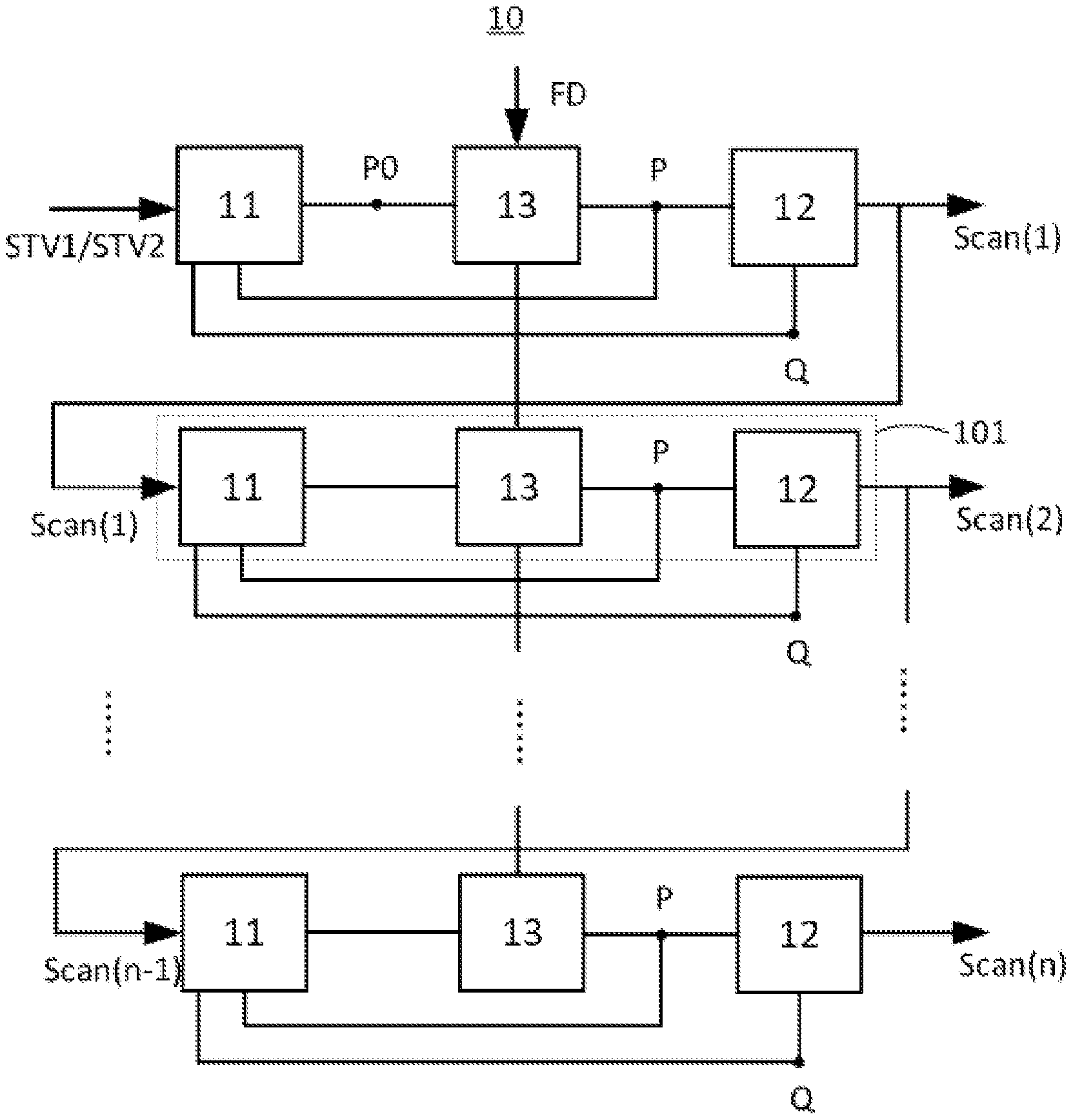
FIG. 1 is a schematic structural diagram of a gate driving module according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, the term "first", "second", or the like are for illustrative purposes only and are not to be construed as indicating or imposing a relative importance or implicitly indicating the number of technical features indicated. Thus, a feature that limited by "first", "second" may expressly or implicitly include at least one of the features. A source and a drain of the transistor are not distinguished herein, and they can be interchanged. In addition, it should be noted that the drawings provide a structure which is relatively close to the present application and omits some details which are not very relevant to the application, so as to simplify the drawings and make the application point clear, rather than indicating that the apparatus in practice is the same as that in the drawings and is not intended to be a limitation of the apparatus in practice.

Referring to "embodiments" in this specification means that specific features, structures, or characteristics described in connection with the embodiments may be included in at least one embodiment of the present application. The phrase "embodiments" appearing at various respective locations in the specification does not necessarily refer to a same embodiment, or is an independent or alternative embodiment that is mutually exclusive from another embodiment. It is explicitly and implicitly understood by a person skilled in the art that the embodiments described in this specification may be combined with other embodiments.

The present application provides a gate driving circuit, including but not limited to the following embodiments and a combination of the following embodiments.

Figure 2:
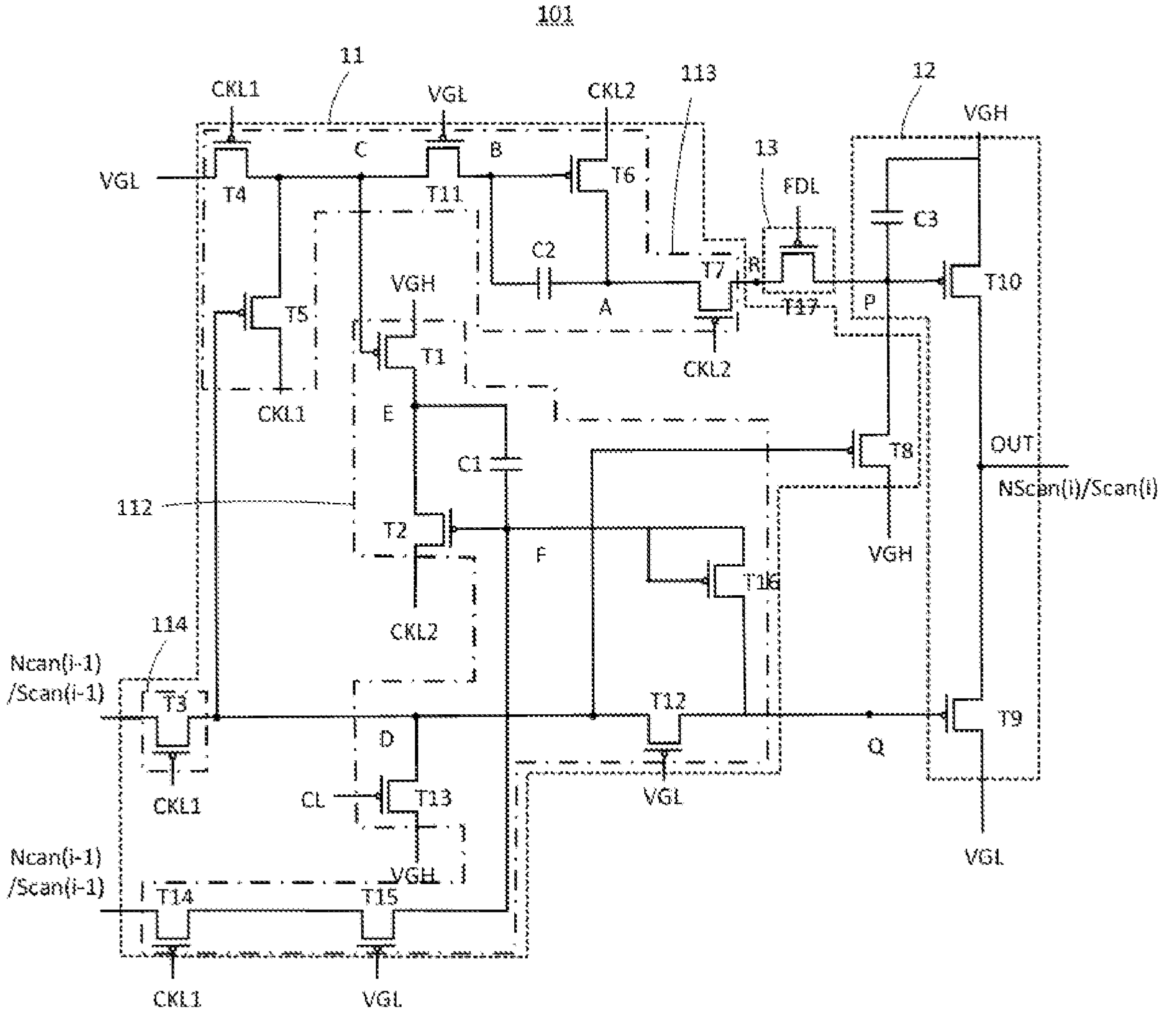
FIGS. 2 and 3 are circuit diagrams of two kinds of gate driving circuits according to embodiments of the present application, respectively.
Figure 3:
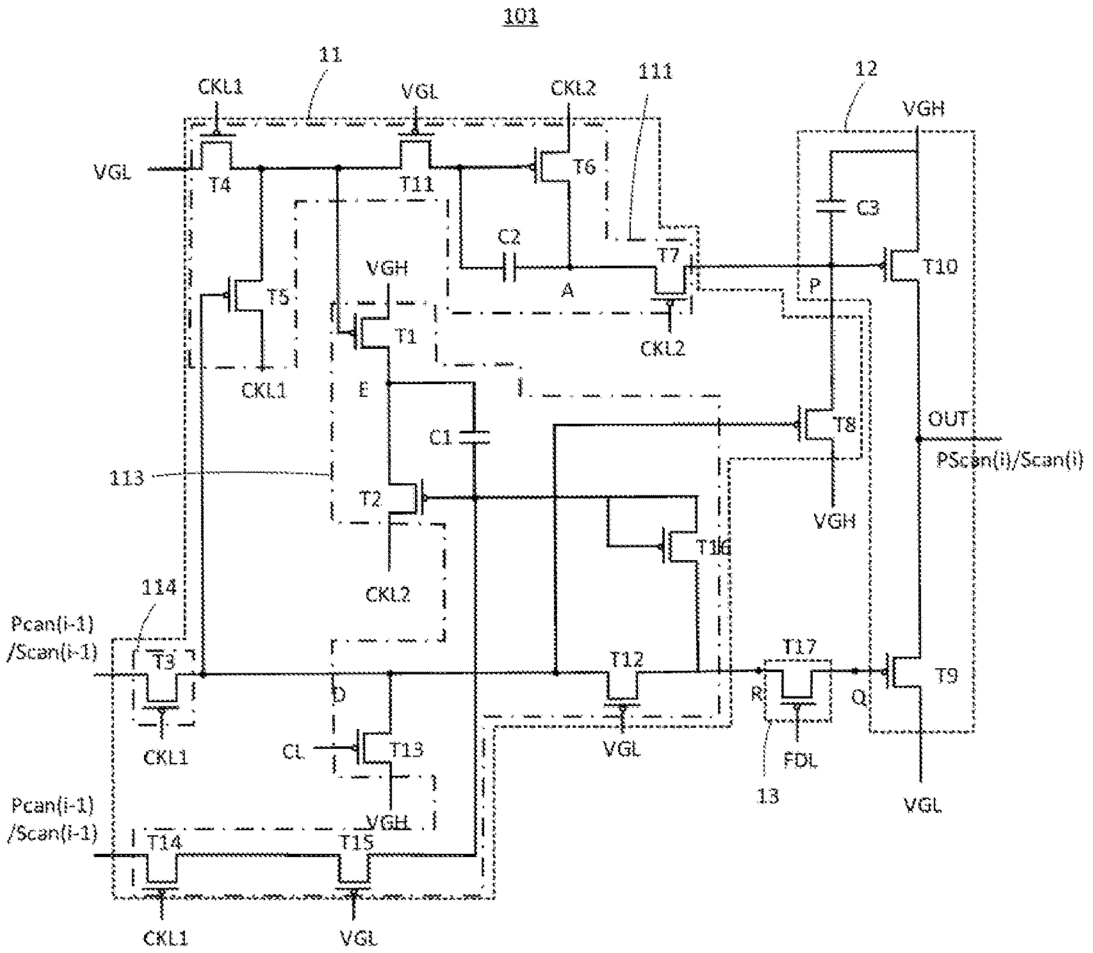

In an embodiment, as shown in FIGS. 1 to 3, the gate driving module 10 includes a frequency division control line FDL and a plurality of cascaded gate driving circuits 101. The frequency division control line FDL is configured to transmit a frequency division control signal FD to the plurality of cascaded gate driving circuits 101. Each of the gate driving circuits 101 includes: a gate control unit 11 for receiving a gate control signal Scan generated by an upper stage of gate driving circuit 101; an output unit 12 electrically connected to the gate control unit 11 via a first node P and a second node Q and for outputting a current-stage of gate control signal according to signals from the first node P and the second node Q for transmission to a gate control unit 11 in a lower stage of gate driving circuit 101; and a frequency division control unit 13 electrically connected between the gate control unit 11 and the output unit 12 for controlling a signal from one of the first node P and the second node Q according to the frequency division control signal to control the output unit 12 to output the gate control signal.

Specifically, an example in which n (where $n \geq 2$) gate driving circuits 101 are connected in cascade in FIG. 1 is taken for illustration. The first gate driving circuit 101 may use a first starting signal STV1 or a second starting signal STV2 (which have opposite phases) as "an upper-stage gate control signal" of the first gate driving circuit 101 to output a current-stage gate control signal Scan(1) to a lower stage of gate driving circuit 101 according to the upper-stage gate control signal, and so on. An (n−1)-th stage of gate driving circuit 101 may output a current-stage (i.e., (n−1)-th stage) gate control signal Scan(n−1) to a lower stage (i.e., n-th stage) of gate driving circuit 101 according to an (n−2)-th stage gate control signal Scan(n−2), thereby controlling an n-th stage of gate driving circuit 101 to output a current-stage (i.e., n-th stage) gate control signal Scan(n). In FIGS. 2 and 3, an i-th stage of gate driving circuit 101 is taken as an example for illustration, and can output a current-stage (i.e., i-th stage) gate control signal Scan(i) according to an (i−1)-th gate control signal Scan(i−1).

It can be understood in the present embodiment that the frequency division control unit 13 is electrically connected between the gate control unit 11 and the output unit 12, and can control the signal from one of the first node P and the second node Q according to the frequency division control signal FD. That is, a signal transmitted to the output unit 12 can be controlled on the basis of the signal from another one of the first node P and the second node Q electrically connected to the output unit 12 being unchanged, thereby controlling a specific case of the gate control signal output from the output unit 12. As such, when the gate driving module 10 is applied to the display panel, light emitting conditions of a plurality of rows of sub-pixels Pi can be further controlled by controlling a plurality of gate control signals Scan respectively generated by a plurality of gate driving circuits 101, so that the plurality of rows of sub-pixels Pi are further controlled in different frames to be in different light emitting conditions, resulting in different number of frames in a plurality of frames in which sub-pixels Pi in different areas emit light or do not emit light. That is, driving of the display panel in a frequency division manner can be implemented by a same gate driving module 10.

In particular, the frequency division control unit 13 is electrically connected between the gate control unit 11 and the output unit 12 in the present application, and specific structures of the frequency division control unit 13, the gate control unit 11, and the output unit 12 are not limited herein. Regardless of the specific combination of the frequency division control unit 13, the gate control unit 11, and the output unit 12, it is possible to disable the gate control signal outputted from the current stage (that is, a next-stage stage transmission signal) if the signal for controlling one of the first node P and the second node Q from the gate driving circuit of the current stage is disabled (i.e., there is no valid pulse), and therefore the gate control signals of all subsequent stages starting from the next-stage are disabled, so that the influence of the frequency division control signal on the existence of "switching pulse" of the gate control signals from the current stage to the last stage is not considered when the frequency division control signal is transitioned in the current stage (seeing, for example, the gate control signals NScan(3) to NScan(6) in an Frame 2, the gate control signals NScan(5) to NScan(6) in an Frame 3, and NScan(3) to NScan(6) in an Frame 4 in a subsequent FIG. 8). Moreover, since the first node or the second node in the gate driving circuit of each of all the preceding stages has been loaded with a voltage that can be used to control respective one of the gate control signals generated by the gate control unit 11 to output a valid pulse before the transition of the frequency division control signal occurs in the current stage, even if the first node or the second node of each of all the stages is subsequently disconnected from the corresponding gate control unit 11 due to the transition of the frequency division control signal in the current stage, and the voltage loaded at the first node or the second node is still valid, so it is possible to control the corresponding gate control signal to be valid, i.e., output a valid pulse (seeing, for example, the gate control signals NScan(1) to NScan(2) in the Frame 2, the gate control signals NScan(1) to NScan(4) in the Frame 3, and the gate control signals NScan(1) to NScan(2) in the Frame 4 in the subsequent FIG. 8).

In summary, in the present application, the above-mentioned problem of "switching pulse" does not exist. Therefore, the pulse width of the valid pulse output by the gate control signal may not be limited, and may be set to be large to sufficiently turn on the respective one of the sub-pixels.

Figure 8:
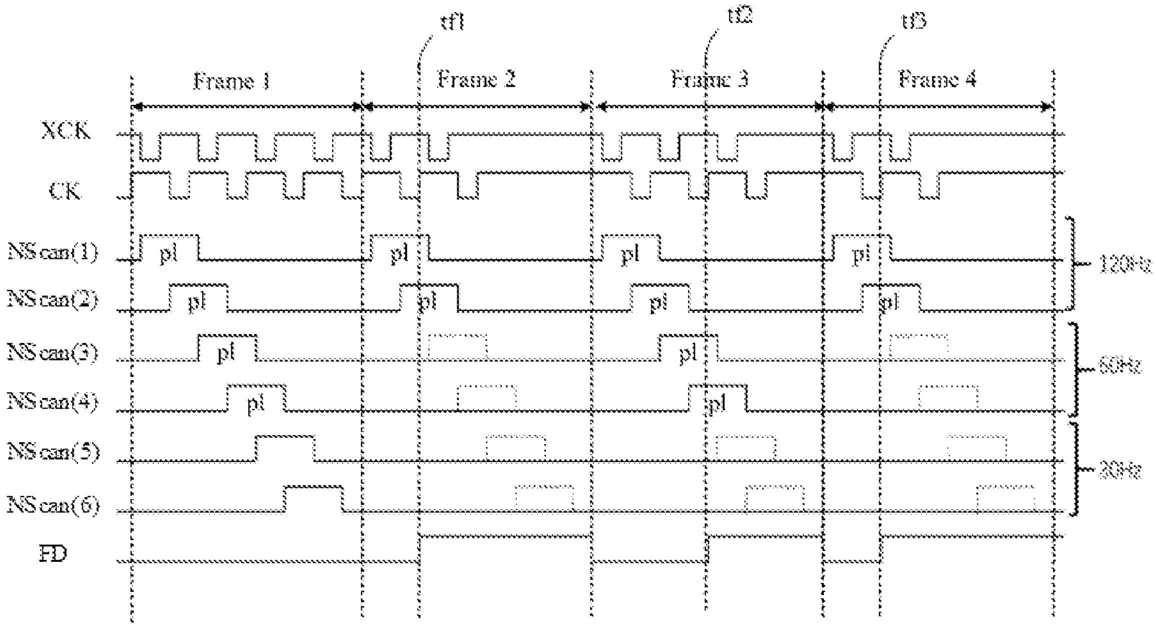
FIG. 8 is a waveform diagram of some signals in a multi-stage gate driving circuit according to an embodiment of the present application.

An example in which only 8 stages of gate driving circuits are arranged continuously and every two stages of gate driving circuits correspond to the same refresh rate, and 4 frames are shown is taken in FIG. 8 for illustration. However, the number of stages of the gate driving circuits of the display panel, and setting of the refresh rate and the number of frames are not limited thereto.

In one embodiment, as shown in FIG. 1 to FIG. 3, the frequency division control unit 13 includes a control transistor T17, where, a gate of the control transistor T17 is electrically connected to the frequency division control line FDL, a source of the control transistor T17 is electrically connected to the gate control unit 11 via a third node R, and a drain of the control transistor T17 is electrically connected to the output unit 12 via the first node P or the second node Q. The frequency division control signal is configured to control the third node R to be electrically connected to or disconnected from the first node P or the second node Q. Specifically, the frequency division control unit 13 may function as a switch, that is, the third node R connected to the source of the control transistor T17 may be electrically connected to or disconnected from the first node P or the second node Q connected to the drain of the control transistor T17 under the action of the frequency division control signal, so that a signal from the third node R may or may not be received by the first node P or the second node Q connected to the output module, thereby controlling a specific case of the output gate control signal. Similarly, each of the gate driving circuits 101 may be configured to realize driving of the display panel in a frequency division manner according to the corresponding gate control signal generated by the control transistor T17 in the frequency division control unit 13 in the gate driving circuit 101.

Further, the gate control unit 11 may further include a thirteenth transistor T8 electrically connected to the first node P, where a source of the thirteenth transistor T8 is loaded with a first voltage VGH, a gate of the thirteenth transistor T8 is electrically connected to a node D, and a drain of the thirteenth transistor T8 is electrically connected to the first node.

In one embodiment, as shown in FIGS. 1 to 3, the output unit 12 includes: a first output transistor T10, where a gate of the first output transistor T10 is electrically connected to the first node P, a source of the first output transistor T10 is electrically connected to a line for the first voltage VGH to load the first voltage VGH, and a drain of the first output transistor T10 is electrically connected to a signal output terminal OUT of the gate driving circuit 101 for outputting the gate control signal; and a second output transistor T9, where a gate of the second output transistor T9 is electrically connected to the second node Q, a source of the second output transistor T9 is electrically connected to a line for a second voltage VGL to load the second voltage VGL, and a drain of the second output transistor T9 is electrically connected to the signal output terminal OUT.

Specifically, the first node P may control an ON condition of the first output transistor T10 to control whether the first voltage VGH can be transmitted to the signal output terminal OUT, and the second node Q may control an ON condition of the second output transistor T9 to control whether the second voltage VGL can be transmitted to the signal output terminal OUT. Further, as can be seen from the above discussion in the present application that a specific case of the gate control signal output from the signal output terminal OUT is controlled by setting the control transistor T17 connected between the third node R and the first node P to control whether the first node P or the second node Q can receive the signal from the third node R to control the ON condition of the first output transistor T10 and the ON condition of the second output transistor T9.

For example, when the first output transistor T10 is turned on and the second output transistor T9 is turned off, the gate control signal output from the signal output terminal OUT may be equal to the first voltage VGH. For another example, when the first output transistor T10 is turned off and the second output transistor T9 is turned on, the gate control signal output from the signal output terminal OUT may be equal to the second voltage VGL. For yet other example, when both the first output transistor T10 and the second output transistor T9 are turned off, the gate control signal output from the signal output terminal OUT may be equal to a previous voltage. For other example, when both the first output transistor T10 and the second output transistor T9 are turned on again, the gate control signal output from the signal output terminal OUT may be between the first voltage VGH and the second voltage VGL.

In one embodiment, the gate driving circuit 101 is electrically connected to one or more pixel driving circuits 202, the signal output terminal OUT is electrically connected to a gate of a pixel transistor in each of the pixel driving circuits 202, and the first voltage VGH is greater than the second voltage VGL. As shown in FIG. 2, the pixel transistor is an N-type transistor (in this case, the gate driving circuit 101 may be considered as a NScan circuit, and the gate control signal is a NScan signal), and the drain of the control transistor T17 is electrically connected to the first node P. Alternatively, as shown in FIG. 3, the pixel transistor is a P-type transistor (in this case, the gate driving circuit 101 may be considered as a PScan circuit, and the gate control signal is a PScan signal), and the drain of the control transistor T17 is electrically connected to the second node Q.

The configuration of the pixel driving circuit 202 is not limited in the present embodiment, and it can be considered that the pixel transistor in the pixel driving circuit 202 can be controlled by the gate control signal output from the signal output terminal OUT of the gate driving circuit 101 to control a light emitting brightness of a light emitting device 201. Specifically, in the present embodiment in which the first voltage VGH is greater than the second voltage VGL, when the pixel transistor is the N-type transistor, the drain of the control transistor T17 is electrically connected to the first node P, so that the ON condition of the first output transistor T10 can be controlled to control whether a larger first voltage VGH (which is a valid voltage of the N-type transistor) can be transmitted to the gate of the N-type pixel transistor, thereby controlling whether the respective light emitting device 201 emits light; and when the pixel transistor is the P-type transistor, the drain of the control transistor T17 is electrically connected to the second node Q, so that the ON condition of the second output transistor T9 can be controlled to control whether a smaller second voltage VGL (which is a valid voltage of the P-type transistor) can be transmitted to the gate of the P-type pixel transistor, thereby controlling whether the corresponding light emitting device 201 emits light.

As can be seen from the above discussion that, if a valid voltage required to turn on the N-type or P-type pixel transistor has the same duration, it can be considered that, among the NScan signal and the PScan signal respectively output by the NScan circuit and the PScan circuit, a voltage value of the valid pulse of the NScan signal (such as but not limited to being equal to the first voltage VGH) is greater than that of the valid pulse of the PScan signal (such as but not limited to being equal to the second voltage VGL), and the valid pulses of the NScan and PScan signals can have the same pulse width.

Further, since the gate control unit 11 can receive the gate control signal generated by the upper stage of gate driving circuit 101, it can be seen from a stage transmission function of the gate control signal that a first start signal STV1 and a second start signal STV2 respectively loaded to the first stage of NScan circuit and the first stage of PScan circuit can be also obtained by translating the first stage of NScan signal (1) and the first stage of PScan signal (1) by equal distances in a negative direction of a time axis, that is, the voltage values of the valid pulses of the NScan and PScan signals can be equal to the first voltage VGH and the second voltage VGL, respectively. The first start signal STV1, the second start signal STV2, the NScan signal, and the PScan signal may all be periodic signals.

In one embodiment, as shown in FIGS. 2 and 3, the gate control unit 11 includes a third node control unit 113 electrically connected to a clock signal line (which may include, but is not limited to, a first clock signal line CKL1 and a second clock signal line CKL2, both of which may be respectively loaded with a first clock signal XCK and a second clock signal CK. The first clock signal XCK and the second clock signal CK may be symmetrical about the time axis and include different voltage values, where a voltage value at an intersection of the time axis and a voltage axis is not limited herein) and the third node R for controlling a signal from the third node R according to a clock signal transmitted via the clock signal line; a second node control unit 112 (as shown in FIG. 2) electrically connected to the clock signal line and the second node Q for controlling a signal from the second node Q according to the clock signal, or a first node control unit 111 (as shown in FIG. 3) electrically connected to the clock signal line and the first node P for controlling a signal from the first node P according to the clock signal; and an input unit 114, where an input terminal of the input unit 114 is electrically connected to the upper stage of gate driving circuit 101 to load the gate control signal generated by the upper stage of gate driving circuit 101, and an output terminal of the input unit 114 is electrically connected to the third node control unit and the second node control unit 112 or electrically connected to the third node control unit and the first node control unit 111.

It should be noted that, for ease of description in the present application, an example in which the second output transistor T9 is located below the first output transistor T10 (i.e., the second node Q is located below the first node P) is taken only in the schematic diagram for illustration. In practice, a connection relationship among a plurality of electronic devices is protected by the present application and is not limited to a positional relationship. The gate control signal generated by the upper stage of gate driving circuit 101 is loaded on the basis of the input unit 114. As shown in FIG. 2, for the NScan circuit, the frequency division control unit 13 is connected to the first node P disposed at an upper side of the NScan circuit, that is, it can be considered that the third node R is also disposed at the upper side, and in this case, it can be considered that the third node control unit needs to be disposed on the upper side to control the voltage of the third node R (the voltage of the first node P is further controlled in combination with the frequency division control unit 13), and the voltage of the second node Q needs to be controlled by the second node control unit 112 disposed at a lower side of the NScan circuit. As shown in FIG. 3, for the PScan circuit, since the frequency division control unit 13 is connected to the second node Q disposed at the lower side, that is, it can be considered that the third node R is also disposed at the lower side, in this case, it can be considered that the third node control unit needs to be disposed at the lower side to control the voltage of the third node R (the voltage of the second node Q needs to be further controlled in combination with the frequency division control unit 13), and the voltage of the first node P needs to be controlled by the first node control unit 111 disposed at the upper side.

In one embodiment, as shown in FIG. 2, the drain of the control transistor T17 is electrically connected to the first node P (an example in which the gate driving circuit 101 is the NScan circuit is taken in this case). The input unit 114 includes an input transistor T3, where a gate of the input transistor T3 is loaded with the clock signal (for example, the gate is connected to the first clock signal line to load the first clock signal), a source of the input transistor T3 is configured as an input terminal of the input unit 114, and a drain of the input transistor T3 is configured as an output terminal of the input unit 114. The first node control unit 111 includes a first transistor T4, a seventh transistor T5, and a second transistor T6 and a third transistor T7 connected in series, where a gate of the seventh transistor T5 is electrically connected to the drain of the input transistor T3, a source of the seventh transistor T5 is loaded with the clock signal, a gate of the first transistor T4 is loaded with the clock signal (e.g., a first clock signal), a source of the first transistor T4 is loaded with the second voltage VGL, a drain of the first transistor T4 is electrically connected to a gate of the second transistor T6 and a drain of the seventh transistor T5, a source of the second transistor T6 and a gate of the third transistor T7 are electrically loaded with the clock signal (e.g., the source of the second transistor T6 and the gate of the third transistor T7 are connected to a second clock signal line to load a second clock signal), a drain of the second transistor T6 is electrically connected to a source of the third transistor T7, and a drain of the third transistor T7 is electrically connected to the third node R. The second node control unit 112 includes a fourth transistor T13, a first capacitor C1, and a fifth transistor T1 and a sixth transistor T2 connected in series, where a gate of the fourth transistor T13 (which is connected to a control signal line CL) is loaded with a control signal, a source of the fourth transistor T13 is loaded with the first voltage VGH, a drain of the fourth transistor T13 is electrically connected to the second node Q, a gate of the fifth transistor T1 is electrically connected to the drain of the first transistor T4, a source of the fifth transistor T1 is loaded with the first voltage VGH, a drain of the fifth transistor T1 is electrically connected to a source of the sixth transistor T2, a drain of the sixth transistor T2 is loaded with the clock signal (e.g., the second clock signal), a gate of the sixth transistor T2 is further loaded with a gate control signal generated by the upper stage of gate driving circuit 101, and the first capacitor C1 is electrically connected between the gate and the source of the sixth transistor T2.

an operation of a signal in a portion of states is illustrated by taking an example in which the transistors in the gate driving circuit 101 are all P-type transistors in the present application. At the time of power-on, a control signal transmitted via the CL may control the fourth transistor T13 to be turned on to transmit the first voltage VGH to the second node Q. At the time of later outputting low voltages in both the first clock signal and the (i−1)-th stage of gate control signal NScan(i−1), the gate control signal NScan(i−1) controls both the seventh transistor T5 and the second output transistor T9 to be turned on, the second voltage VGL is transmitted to the signal output terminal OUT via the second output transistor T9, and the first clock signal controls the first transistor T4 to be turned on, and the second voltage VGL and the first clock signal both control the second transistor T6 to be turned on, and in this case, the high voltage in the second clock signal controls the third transistor T7 to be turned off. At the time of later outputting the high voltage in the first clock signal, the second transistor T6, the input transistor T3, and the first transistor T4 are turned off, and in this case, it may be considered that the second output transistor T9 maintains to be turned on, the low voltage in the second clock signal controls the third transistor T7 to be turned on, the third node R is not loaded with a voltage, and the signal output terminal OUT still outputs the second voltage VGL.

It should be noted that the present application does not limit the type of each of the transistors in the gate driving circuit 101. For example, each of the transistors may be a P-type transistor. Alternatively, a portion of the transistors may be an N-type transistor and the remaining of the transistors may be a P-type transistor. The signal may be correspondingly set according to the type of the transistors, and reference may be specifically made to the operation of "an example in which the transistors in the gate driving circuit 101 are all P-type transistors"

Further, the first node control unit 111 may further include an eighth transistor T11 and a second capacitor C2. The second node control unit 112 may further include a ninth transistor T12. The output unit 12 may further include a third capacitor C3 electrically connected between the gate and the source of the first output transistor T10. A gate of the eighth transistor T11 and a gate of the ninth transistor T12 may both be loaded with a second voltage VGL to maintain the eighth transistor T11 and the ninth transistor T12 to be turned on, a source and a drain of the eighth transistor T11 are electrically connected to the drain of the first transistor T4 and the gate of the second transistor T6, respectively, the second capacitor C2 is electrically connected between the gate and the drain of the second transistor T6, and the source and the drain of the ninth transistor T12 are electrically connected to the drain of the input transistor T3 and the second node Q, respectively.

Since the first capacitor C1, the second capacitor C2, and the third capacitor C3 maintain the voltage of the corresponding node and function as a coupling effect, the eighth transistor T11 and the ninth transistor T12 can be ensured to be turned on only when source voltages of both the eighth transistor T11 and the ninth transistor T12 are sufficiently low, so as to maintain the drains of the eighth transistor T11 and the ninth transistor T12 to have lower voltages respectively and facilitate turning on of both the first output transistor T10 and the second output transistor T9.

In one embodiment, as shown in FIG. 2, for the NScan circuit, the second node control unit 112 further includes: a tenth transistor T14, where a source of the tenth transistor T14 is loaded with a gate control signal generated by the upper stage of gate driving circuit 101 and a drain of the tenth transistor T14 is electrically connected to the gate of the sixth transistor T2; and an eleventh transistor T16, where a gate and a source of the eleventh transistor T16 are both electrically connected to the gate of the sixth transistor T2, and a drain of the eleventh transistor T16 is electrically connected to the second node Q. Similarly, the second node control unit 112 may be further provided with a twelfth transistor T15 for maintaining the gate of the sixth transistor T2 to have a lower voltage, where a gate of the twelfth transistor T15 may be loaded with a second voltage VGL, and a source and a drain of the twelfth transistor T15 may be electrically connected to the drain of the tenth transistor T14 and the gate of the sixth transistor T2, respectively.

It should be understood that the second node control unit 112 in the embodiment may be further provided with the above-mentioned tenth transistor T14 and eleventh transistor T16. The second node Q is not directly electrically connected to the first capacitor C1 by the eleventh transistor T16 connected between the second node Q and the gate of the sixth transistor T2 while the tenth transistor T14 may be configured to control the voltage of the gate of the sixth transistor T2, so as to protect the second node Q from coupling of the first capacitor C1, and thus the second node Q may be maintained at a lower voltage.

It should be noted that, as can be seen from comparison of FIG. 3 with FIG. 2, a difference between the PScan circuit and the NScan circuit lies in a difference between the second start signal STV2 and the first start signal STV1 as discussed above, where the input unit 114 and the output unit 12 of both the PScan circuit and the NScan circuit can have the same specific structure, and another difference lies in that the NScan circuit needs to include the third node control unit and the second node control unit 112, while the PScan circuit needs to include the third node control unit and the first node control unit 111. The specific structure of the third node control unit in the NScan circuit may be the same as the specific structure of the first node control unit 111 in the PScan circuit, except that the output terminal of the NScan circuit is connected to the first node P by the frequency division control unit 13, and the output terminal of the PScan circuit is directly connected to the first node P. Similarly, the specific structure of the second node control unit 112 in the NScan circuit may be the same as the specific structure of the third node control unit in the PScan circuit, except that the output terminal of the NScan circuit is directly connected to the second node Q, and the output terminal of the PScan circuit is connected to the second node Q by the frequency division control unit 13.

Further, the gate driving circuit 101 in the present application may also be, but not limited to, an emission (EM) circuit, and the EM circuit and the NScan circuit differ in that the first start signal STV1 is replaced with a third start signal STV3, and it can be understood that the third start signal STV3 may be obtained by translating the first start signal STV1 by a distance in a negative direction or a positive direction of the time axis, and a waveform of the first start signal STV1 may not overlap that of the third start signal STV3. Similarly, the third start signal STV3 may also be a periodic signal.

The present application provides a display panel, including but not limited to following embodiments and a combination of the following embodiments.

Figure 4:
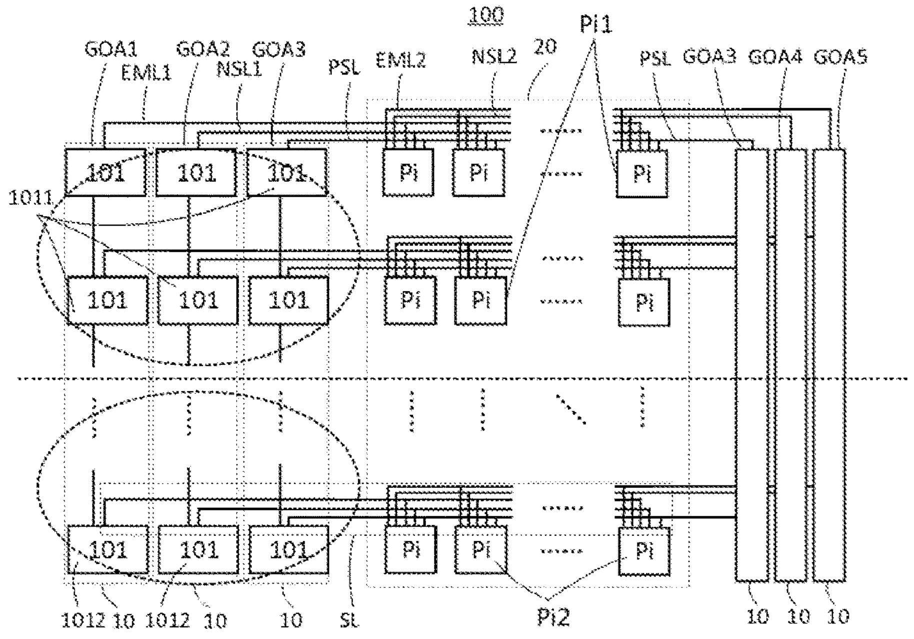
FIG. 4 is a schematic structural diagram of a display panel according to an embodiment of the present application.
Figure 5:
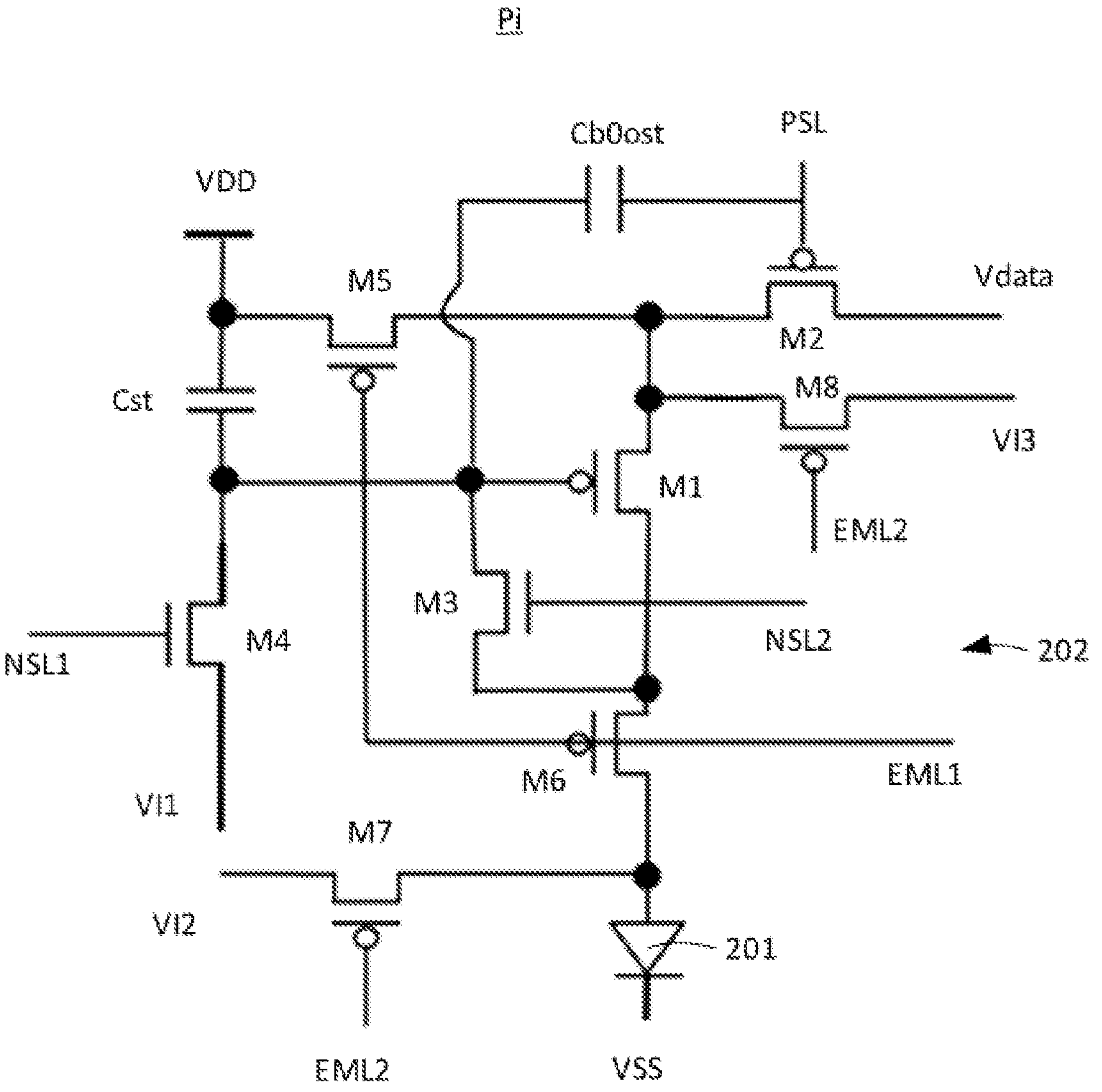
FIG. 5 is a circuit diagram of a pixel driving circuit according to an embodiment of the present application.

In one embodiment, as shown in FIG. 4, the display panel 100 includes at least one gate driving module 10 as described above; and a panel body 20 including a plurality of sub-pixels Pi and a plurality of scanning lines SL. As shown in FIG. 5, each of the sub-pixels Pi includes a light emitting device 201 and a pixel driving circuit 202 for driving the light emitting device 201 to emit light, where the pixel driving circuit 202 includes at least one transistor (i.e., the pixel transistor discussed above). The gate control signal output by the gate driving circuit 101 is transmitted to gates of a plurality of transistors in corresponding ones of the pixel driving circuits 202 via the corresponding one of the scanning lines SL.

An example in which the display panel 100 includes six gate driving modules 10 (GOA1, GOA2, two GOA3, GOA4, and GOA5, which are electrically connected to the corresponding sub-pixels Pi by the first scanning line EML1, the second scanning line NSL1, the third scanning line PSL, the fourth scanning line NSL2, and the fifth scanning line EML2, respectively) is taken in FIG. 4 for illustration. For example, the two GOA3 may be but not limited to the same PScan circuit, that is, the signals (the second start signal STV2) loaded by the two GOA3 and the signals output by the two GOA3 may be the same, respectively, so as to improve the reliability of the PScan signals output by the two GOA3. For example, the GOA1 and the GOA5 may be two different EM circuits, respectively, and two third start signals STV3 respectively corresponding to the GOA1 and the GOA5 may be different (for example, but not limited to, the pulse width of the valid pulses of the GOA1 and the GOA5 may be different). For example, the GOA2 and GOA4 may be two different NScan circuits, respectively, and two first start signals STV1 respectively corresponding to the GOA2 and GOA4 may be different (for example, but not limited to, the pulse width of the valid pulses of the GOA2 and GOA4 may be different).

It should be noted that a connection relationship among the plurality of gate driving circuits 101 in the same gate module and a connection relationship between each of the plurality of gate driving circuits 101 and each of the plurality of sub-pixels Pi are only illustrated in FIG. 4, and that a signal line to which each of the gate driving circuits 101 is connected may be described with reference to FIGS. 1 to 3 and related description above.

Specifically, as shown in FIG. 4 and FIG. 5, the pixel driving circuit 202 may include a data transistor M2, where a source of the data transistor M2 is loaded with a data signal Vdata, a drain of the data transistor M2 is electrically connected to a source of a driving transistor M1, and a gate of the data transistor M2 (e.g., the P-type transistor) may be electrically connected to the third scanning line PSL to load an PScan signal.

The pixel driving circuit 202 may further include a reset transistor M4 and a compensation transistor M3, where a gate of the reset transistor M4 (e.g., the N-type transistor) may be electrically connected to the scanning line NSL1 to load the NScan1 signal, and the reset transistor M4 is configured to enable a reset signal VI1 to be transmitted to a gate of the driving transistor M1 for reset, a gate of the compensation transistor M3 (e.g., the N-type transistor) can be electrically connected to the fourth scanning line NSL2 to load the NScan2 signal, and a source and a drain of the compensation transistor M3 are electrically connected to a drain and a gate of the driving transistor M1 respectively.

The pixel driving circuit 202 may further include an initial transistor M7, where a gate of the initial transistor M7 (e.g., the P-type transistor) is electrically connected to the fifth scanning line EML2 to load the EM2 signal, a drain of the initial transistor M7 is electrically connected to one terminal of the light emitting device 201 (the other terminal of the light emitting device 201 may be loaded with the low voltage signal VSS), and the initial transistor M7 is configured to enable an initialization signal VI2 to be transmitted to one terminal of the light emitting device 201 for initialization.

The pixel driving circuit 202 further includes a reset transistor M8, where a gate of the reset transistor M8 (e.g., the P-type transistor) may be electrically connected to the fifth scanning line EML2 to load the EM2 signal, a drain of the reset transistor M8 is electrically connected to the source of the driving transistor M1, and the reset transistor M8 is configured to enable a reset signal VI3 to be transmitted to the source of the driving transistor M1 to reset a potential of the driving transistor M1.

The pixel driving circuit 202 may further include a first light emitting control transistor M5 and a second light emitting control transistor M6, where a source of the first light emitting control transistor M5 is loaded with a first high voltage VDD, a drain of the first light emitting control transistor M5 is electrically connected to the source of the driving transistor M1, a source and a drain of the second light emitting control transistor M6 are electrically connected to the drain of the driving transistor M1 and one terminal of the light emitting device 201, respectively, and the gates of both the first light emitting control transistor M5 and the second light emitting control transistor M6 (for example, both P-type transistors) are electrically connected to the first scanning line EML1 to load the EM1 signal, and both configured to control the light emitting timing of the light emitting device 201 according to the EM1 signal.

The pixel driving circuit 202 further includes a storage capacitor Cst connected in series between the source of the first light emitting control transistor M5 and the gate of the driving transistor M1.

The pixel driving circuit 202 further includes a boosting capacitor Cboost connected in series between the gate of the driving transistor M1 and the gate of the data transistor M2.

Figure 6:
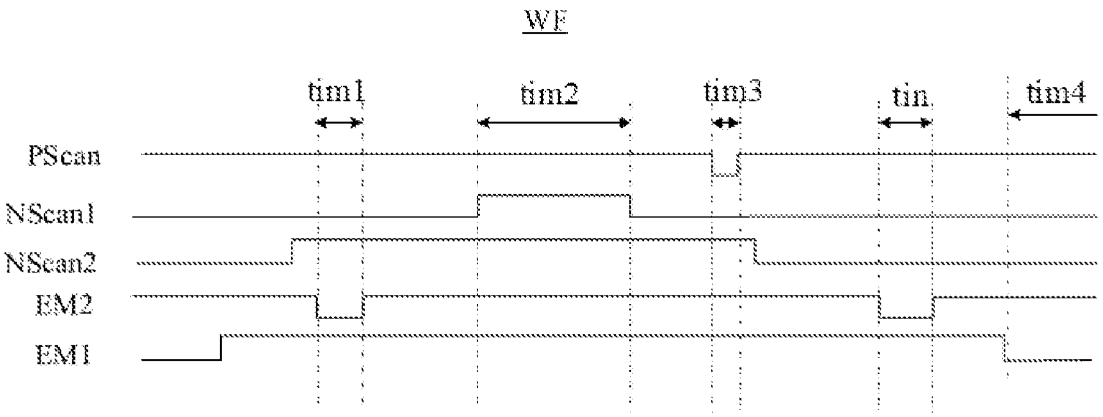
FIG. 6 is a waveform diagram of some signals in a pixel driving circuit according to an embodiment of the present application.

Based on the above discussion, as shown in FIG. 6, a writing frame WF of the display panel may include includes a first reset phase tim1, a second reset phase tim2, a data writing phase tim3, and a light emitting phase tim4. A specific operation process of the display panel is as follows.

In the first reset phase tim1, the initial transistor M7 and the reset transistor M8 are turned on according to the corresponding EM2 signal, and the compensation transistor M3 is turned on according to the corresponding NScan2 signal, so that an anode of the light emitting device 201 is reset in accordance with the initialization signal VI2, and an input terminal, an output terminal, a control terminal source (i.e., the source, the drain, and the gate) of the driving transistor M1 are reset according to the reset signal VI3.

In the second reset phase tim2, the reset transistor M4 is turned on according to the corresponding NScan1 signal, and the compensation transistor M3 is turned on according to the corresponding NScan2 signal, so that the gate and the drain of the driving transistor M1 are reset according to the initialization signal VI2.

In the data writing phase tim3, the data transistor M2 is turned on according to the corresponding PScan signal, and the compensation transistor M3 is turned on according to the corresponding NScan2 signal, so that the gate of the driving transistor M1 can write a data signal Vdata.

In the light emitting phase tim4, the first light emitting control transistor M5 and the second light emitting control transistor M6 are turned on according to the EM1 signal, so that the driving transistor M1 generates a driving current to drive the corresponding light emitting device 201 to emit light.

Further, the third reset phase tin may be included between the light emitting phase tim4 and the data writing phase tim3, where the initial transistor M7 and the reset transistor M8 are turned on according to the corresponding EM2 signal, so that the anode of the light emitting device 201 is reset according to the initialization signal VI2, and the source and drain of the drive transistor M1 are reset according to the reset signal VI3.

As can be seen from the above discussion that, since the normal light emission of each row of sub-pixels Pi is to be realized in the writing frame WF, each of the GOA1 to the GOA5 needs to output a corresponding valid pulse at a corresponding time period in the writing frame WF to control the corresponding transistor in the pixel driving circuit 202 to be turned on so as to realize a corresponding function of the pixel driving circuit 202. It can also be considered that, if at least one of the GOA1 to the GOA5 cannot output a corresponding valid pulse at a corresponding time period in the writing frame WF, the corresponding row of sub-pixels Pi cannot emit light. As shown in FIG. 5, if the PScan signal transmitted via the third scanning line PSL does not have a valid (low voltage) pulse, the data transistor M2 cannot be turned on, so that the data signal cannot be written into the source of the driving transistor M1 and thus the sub-pixel Pi cannot emit light. If the EM1 signal transmitted via the first scanning line EML1 does not have a valid (high voltage) pulse, the first light emitting control transistor M5 and the second light emitting control transistor M6 cannot be turned on, which may cause a driving current to be unable to be formed and the sub-pixel Pi to be unable to emit light. If the NScan2 signal transmitted via the fourth scanning line NSL2 does not have a valid (low voltage) pulse, the compensation transistor M3 cannot be turned on, which may cause the data signal to be unable to be written into the gate of the driving transistor M1 and the sub-pixel Pi to be unable to emit light. Of course, if the EM2 signal and the NScan signal do not have the valid pulse, the light emission of the sub-pixels Pi may be affected to a certain extent.

Therefore, based on the pixel driving circuit 202 shown in FIG. 5, at least one of three gate driving circuits 101 for generating the PScan signal, the EM1 signal, and the NScan2 signal, respectively, in the present application may be provided with a frequency division control unit 13. On the basis that the start signal of each of the GOA1 to the GOA5 has been set, it can be implemented that the third node R is electrically connected to the first node P (for FIG. 2) or the second node Q (for FIG. 3) by properly setting the frequency division signal in each of the frames, so that the output gate control signal has a valid pulse or does not have the valid pulse to control whether the corresponding row of sub-pixels Pi emit light or not.

It should be noted in the present application that the gate control signal output from the signal output terminal OUT of the current stage of gate driving circuit 101 is loaded not only to the corresponding row of sub-pixels Pi of the current stage, but also to the lower stage of gate driving circuit 101. Therefore, if the third node R in the current stage of gate driving circuit 101 is not electrically connected to the first node P (for FIG. 2) or the second node Q, the current-stage gate control signal does not have a valid pulse in a frame (that is, the corresponding row of sub-pixels Pi of the current stage cannot emit light), that is, the operation of the lower stage of gate driving circuit 101 cannot be controlled, and thus the lower stage gate control signal does not have the valid pulse (that is, the corresponding row of sub-pixels Pi of the lower stage cannot emit light), and so on, a subsequent row of sub-pixels Pi cannot emit light. That is, only when the third node R in each stage of gate driving circuit 101 is electrically connected to the first node P (for FIG. 2) or the second node Q, it is possible to realize light emission of all rows of sub-pixels Pi.

In one embodiment, as shown in FIG. 4, the plurality of cascaded gate driving circuits 101 includes a plurality of cascaded first gate driving circuits 1011, and a plurality of cascaded second gate driving circuits 1012 that are cascaded after the plurality of cascaded first gate driving circuits 1011, where the plurality of sub-pixels Pi include a plurality of first sub-pixels Pi1 electrically connected to the plurality of first gate driving circuits 1011 and a plurality of second sub-pixels Pi2 electrically connected to the plurality of second gate driving circuits 1012, the plurality of first sub-pixels Pi1 constitute a first display area, the plurality of second sub-pixels Pi2 constitute a second display area, and a refresh rate of the first display area is greater than a refresh rate of the second display area.

As can be seen from the above discussion, the present application controls whether the output gate control signal has the valid pulse or not by disposing the frequency division control unit 13 electrically connected between the gate control unit 11 and the output unit 12 in the pixel driving circuit 202 for controlling the signal from one of the first node P and the second node Q according to the frequency division control signal, that is, by controlling whether one of the first node P and the second node Q is electrically connected to the gate control unit 11 (to obtain a signal from the third node R).

Further, among a plurality of continuous frames, it can be controlled in at least one of the preceding frames that all stages of gate control signals have valid pulses, and it can be controlled in at least one of the following frames that at least one of the preceding stages of gate control signals (corresponding to a plurality of first sub-pixels Pi1) have the valid pulses and the gate control signals from the subsequent stage to the last stage (corresponding to a plurality of second sub-pixels Pi2) do not have the valid pulses. That is, the plurality of first sub-pixels Pi1 emit light in more frames in the successive frames than the plurality of second sub-pixels Pi2, so that the first display area has a larger refresh rate than the second display area. Therefore, the display panel can realize a differential setting of refresh rates in different areas on the basis of setting one gate driving module 10, taking into account the cost and the frequency division function of the display panel.

Therefore, it can be seen from the above discussion that, in at least one frame (e.g., "at least one of the following frames" described above), the frequency division control signal is configured to control the gate control signal output by the first gate driving circuit 1011 to include a valid pulse to control that the corresponding light emitting device 201 emits light and configured to control the gate control signal output by the second gate driving circuit 1012 to be unable to include the valid pulse to control that the corresponding light emitting device 201 does not emit light.

Figure 7:
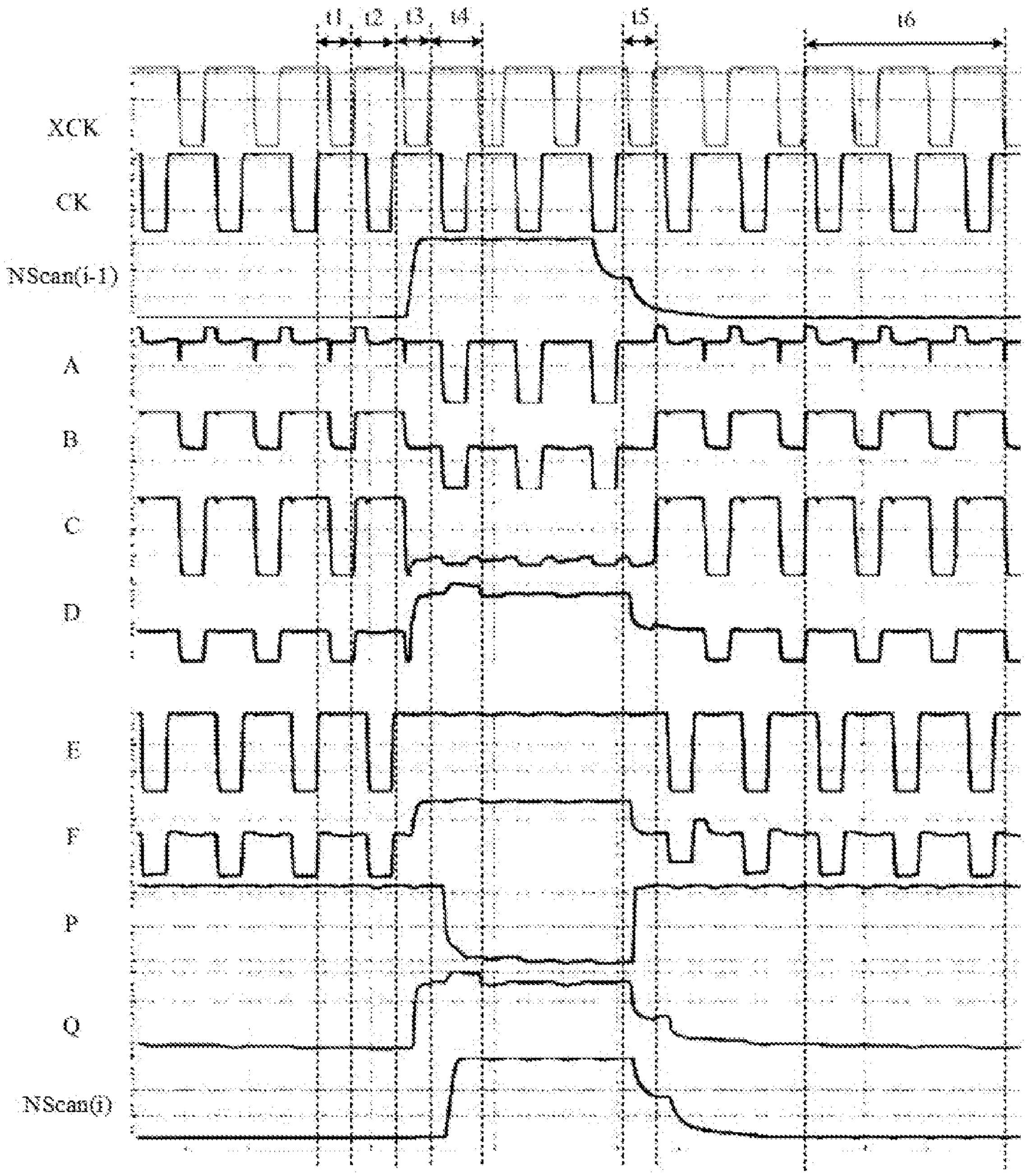
FIG. 7 is a waveform diagram of some signals in a single-stage gate driving circuit according to an embodiment of the present application.

Specifically, taking the NScan circuit shown in FIG. 2 as an example hereinafter, each of the transistors in FIG. 2 is the P-type transistor (i.e., the low voltage of the transistor is valid), the control transistor T17 is turned on (i.e., the control signal of the control transistor has a lower voltage), and the first clock signal XCK and the second clock signal CK are transmitted via the first clock signal line and the second clock signal line, respectively. An operation timing of an i-th stage of NScan circuit shown in FIG. 7 is used to illustrate the i-th stage of NScan circuit and may include, but not limited to, following six operation phases t1 to t6.

In a first operation phase t1, the first clock signal XCK is set to be low, the second clock signal CK is set to be high, and the stage transmission signal NScan(i−1) is set to be low. The third transistor T7 is at an off state according to the second clock signal CK. All of the first transistor T4, the input transistor T3, and the tenth transistor T14 are turned on according to the first clock signal XCK, and the stage transmission signal NScan(i−1), which is set to be low, is transmitted to the node D, the second node Q, and the node F, so that all of the seventh transistor T5, the thirteenth transistor T8, the second output transistor T9, the sixth transistor T2, and the eleventh transistor T16 are turned on according to the NScan(i−1). The second voltage VGL is transmitted to the node C and the node B, the second clock signal CK, which is set to be high, is transmitted to the node E, and the first voltage VGH is transmitted to the node P (node R), so that both the second transistor T6 and the fifth transistor T1 are turned on according to the second voltage VGL. The second clock signal CK, which is set to be high, is transmitted to the node A, so that the second capacitor C2 is charged to a voltage difference between potentials of the node A and the node B. The first voltage VGH is transmitted to the node E (the potential of the node E may be between the first voltage VGH and the high potential of the second clock signal CK), so that the first capacitor C1 is charged to a voltage difference between potentials of the node E and the node F. The first capacitor C1 is charged so that the potential of the node F is pulled up due to a coupling effect. Since the first output transistor T10 is turned off and the second output transistor T9 is turned on, the gate control signal NScan(i) is a low voltage.

In a second operation phase t2, the first clock signal XCK is set to be high, the second clock signal CK is set to be low, and the stage transmission signal NScan(i−1) is set to be low. The first transistor T4, the input transistor T3, and the tenth transistor T14 are at the off state according to the first clock signal XCK, and the gate of the seventh transistor T5, the node D, the second node Q, and the node F are maintained at previous voltages. The sixth transistor T2 is maintained to be at an on state, and the second clock signal CK, which is set to be low, is transmitted to the node E, and the potential of the node F is further pulled down by a falling coupling of the second clock signal CK to the first capacitor C1, so that the eleventh transistor T16 is maintained at the on state, and the potential of the node F is transmitted to the node D, but the potential of the node D is also pulled up by an increasing coupling of the first clock signal XCK transmitted via the first clock signal line CKL1 in the circuit layout. The eleventh transistor T16 is turned off, the potential of the second node Q can be prevented from changing with the potential of the node D due to the action of the ninth transistor T12, and the second output transistor T9 is maintained at the on state. The seventh transistor T5 is still maintained at the on state, and the first clock signal XCK, which is set to be high, is transmitted to both the node C and the node B, so that the fifth transistor T1 and the second transistor T6 are turned off. The thirteenth transistor T8 is turned on according to the potential of the node D, and the first voltage VGH is transmitted to the first node P (node R) so that the first output transistor T10 is turned off, while the third transistor T7 is turned on by the second clock signal CK that is set to be low. The first voltage VGH is further transmitted to the node A to charge the second capacitor C2 to a voltage difference between potentials of the node A and the node B. Since the first output transistor T10 is turned off and the second output transistor T9 is turned on, the gate control signal NScan(i) is the low voltage.

In a third operation phase t3, the first clock signal XCK is set to be low, the second clock signal CK is set to be high, and the stage transmission signal NScan(i−1) is set to be high. The third transistor T7 is at the off state according to the second clock signal CK. All of the first transistor T4, the input transistor T3, and the tenth transistor T14 are turned on according to the first clock signal XCK, and the stage transmission signal NScan(i−1), which is set to be high, is transmitted to the node D, the second node Q, the node F, and the gate of the seventh transistor T5, and the second voltage VGL is transmitted to both the node C and the node B. The second output transistor T9 is turned off, and the seventh transistor T5 is turned off according to the stage transmission signal NScan(i−1) that is set to be high. Both the fifth transistor T1 and the second transistor T6 are turned on according to the second voltage VGL, and the first voltage VGH is transmitted to the node E to charge the first capacitor C1 to a voltage difference between potentials of both the node E and the node F. The second clock signal CK is transmitted to the node A to charge the second capacitor C2 to a voltage difference equal to both the node A and the node B; The thirteenth transistor T8 is turned off according to the signal NScan(i−1) that is set to be high, and the first node P (node R) is maintained at a previous (high) voltage by the C3, so that the first output transistor T10 is turned off. Since the first output transistor T10 is turned off and the second output transistor T9 is turned off, that is, the signal output terminal OUT is suspended, the gate control signal NScan(i) is maintained to be the low voltage.

In a fourth operation phase t4, the first clock signal XCK is set to be high, the second clock signal CK is set to be low, and the stage transmission signal NScan(i−1) is set to be high. All of the input transistor T3, the first transistor T4, and the tenth transistor T14 are at the off state according to the first clock signal XCK, and the gate of the seventh transistor T5, the node D, the second node Q, and the node C are maintained at previous voltages. The seventh transistor T5 is turned off according to a previous high voltage, the second output transistor T9 is turned off according to a previous high voltage at the second node Q, the thirteenth transistor T8 is turned off according to a high voltage at the node D, both the fifth transistor T1 and the second transistor T6 are turned on according to a previous low voltage at the node C, and the sixth transistor T2 is turned off according to a previous high voltage at the node F. The first voltage VGH is transmitted to the node E via the fifth transistor T1, that is, the potential of the node E is substantially unchanged, and the potential of the node F may be substantially unchanged in combination with a coupling effect of the first capacitor C1. The second clock signal CK, which is set to be low, is transmitted to the node A via the second transistor T6, and the potential of the node B is reduced in combination with the coupling effect of the second capacitor C2. The third transistor T7 is turned on according to the second clock signal line CK, and the low voltage at the node A is transmitted to the node P (node R) via the third transistor T7, thereby turning on the first output transistor T10. Since the first output transistor T10 is turned on and the second output transistor T9 is turned off, the gate control signal NScan(i) is the high voltage.

In a fifth operation phase t5, the first clock signal XCK is set to be low, the second clock signal CK is set to be high, and the stage transmission signal NScan(i−1) is set to be low. The third transistor T7 is at the off state according to the second clock signal line CK. All of the first transistor T4, the input transistor T3, and the tenth transistor T14 are turned on according to the first clock signal XCK, and the stage transmission signal NScan(i−1), which is set to be low, is transmitted via the input transistor T3 to the node D, the second node Q, and the gate of the seventh transistor T5. The second output transistor T9 is turned on according to the low voltage at the second node Q, and the sixth transistor T2 is turned on according to a voltage at the node F so that the second clock signal line CK that is set to be high is transmitted to the node E to charge the first capacitor C1 to a voltage difference between potentials of both the node E and the node F. The seventh transistor T5 is turned on so that the first clock signal XCK that is set to be low is transmitted to both the node C and the node B, and the fifth transistor T1 is turned on according to the first clock signal XCK that is set to be low and the second voltage VGL. The first voltage VGH is transmitted via the fifth transistor T1 to the node E (the potential of the node E may be between the first voltage VGH and the high potential of the second clock signal CK), and the potential of the node E is almost unchanged based on the fact that the first voltage VGH and the high potential of the second clock signal CK are equal, and thus the potential of the node F is almost unchanged, and the eleventh transistor T16 is turned off, so that it is possible to avoid that the first capacitor C1 influences a descending speed of the potential of the second node Q. The second transistor T6 is turned on according to the low voltage at the node B so that the second clock signal CK that is set to be high is transmitted to the node A to charge the second capacitor C2 to a voltage difference between potentials of both the node A and the node B. The thirteenth transistor T8 is turned on according to the low voltage at the node D so that the first voltage VGH is transmitted to the first node P (node R), thereby turning off the first output transistor T10. Since the first output transistor T10 is turned off and the second output transistor T9 is turned on, the gate control signal NScan(i) is a low voltage.

In a sixth operation stage t6, the stage transmission signal NScan(i−1) is set to be low, and the first clock signal XCK and the second clock signal CK are alternately set to be low and set to be high, so that the potential of the node F is driven to be coupled downward. Each time the potential of the node F is coupled downward, the voltage at the node F is gradually reduced to be close to −16V, and the potential of the second node Q is gradually reduced to be close to −20V. In the first several periods after the seventh transistor T5 is turned on in the fifth stage, the potential of the node F is coupled downward, and the potential of the second node Q is greatly affected by the potential of the node F. In a later stage in which the eleventh transistor T16 is turned off, the potential of the second node Q is stabilized against being affected by the potential of the node F.

It should be noted that the gate driving circuit 101 provided in the present application may be, but not limited to, a 16T3C structure or a 13T3C structure (where the 16T3C is only illustrated in FIGS. 2 and 3). In comparison with the 13T3C structure, the tenth transistor T14, the twelfth transistor T15, and the eleventh transistor T16 are additionally provided in the 16T3C structure. On the one hand, when the stage transmission signal NScan(i−1) writes a low voltage to the second node Q and the node F, the potential of the second node Q may simultaneously flow out from the transistors T16 and T12, and the second node Q is not directly connected to the capacitor C1 (due to blocking of the transistor T16) to maintain the potential. Therefore, the potential of the second node Q may be decreased more quickly, thereby facilitating turning on of the transistor T9. On the other hand, the second node Q is not directly connected to the capacitor C1 (due to blocking of the transistor T16), so the fluctuation of the potential of the node E does not drive the change of the potential of the second node Q, and the transistor T16 functions as a diode-like function, so that the potential of the second node Q is not pulled up by the node F.

As can be seen from the above discussion, in comparison with FIG. 7, in a period in which the control transistor T17 is turned off (i.e., the control signal is at its higher voltage), that is, the first node P is disconnected from the node R, the potential of the first node P can only be determined by the on state of the transistor T8 and the coupling effect of C3.

Specifically, in the first operation phase t1, the transistor T8 is turned on, and the first voltage VGH is transmitted to the first node P so that the transistor T10 is turned off. In the second operation phase t2, the transistor T8 is turned on, and the first voltage VGH is transmitted to the first node P so that the transistor T10 is turned off. In the third operation phase t3, the transistor T8 is turned off and the first node P is maintained at the first voltage VGH so that the transistor T10 is turned off. In the fourth operation phase t4, the transistor T8 is turned off and the first node P is maintained at the first voltage VGH, so that the transistor T10 is turned off. In the fifth operation phase t5, the transistor T8 is turned on, and the first voltage VGH is transmitted to the first node P so that the transistor T10 is turned off. In the sixth operation phase t6, the transistor T8 is turned on, and the first voltage VGH is transmitted to the first node P so that the transistor T10 is turned off. Therefore, it can be considered that the transistor t10 is turned off at each of the stages, and the gate control signal is related to the on state of the transistor T9, which is shown as follows.

In the first operation phase t1, the transistor T9 is turned on, so that the gate control signal NScan(i) is the low voltage.

In the second operation phase t2, the transistor T9 is turned on, so that the gate control signal NScan(i) is the low voltage.

In the third operation phase t3, the transistor T9 is turned off, i.e., the signal output terminal OUT is suspended, so that the gate control signal NScan(i) is maintained at the low voltage.

In the fourth operation phase t4, the transistor T9 is turned off, i.e., the signal output terminal OUT is suspended, so that the gate control signal NScan(i) is maintained at the low voltage.

In the fifth operation phase t5, the transistor T9 is turned on, so that the gate control signal NScan(i) is the low voltage.

In the sixth operation phase t6, the transistor T9 is turned on, so that the gate control signal NScan(i) is the low voltage.

In summary, in a period in which the control transistor T17 is turned off (i.e., the control signal is at its higher voltage), the gate control signals NScan(i) are all low voltages. In a period in which the control transistor T17 is turned on (i.e., the control signal is at its lower voltage), the gate control signal may have a valid pulse pl (e.g., a high voltage pulse) in corresponding periods (e.g., the fourth operation phase t4 to the sixth operation phase t6 in FIG. 7) under alternating high and low voltages of the stage transmission signal, the first clock signal and the second clock signal, thereby acting on the corresponding transistor (e.g., the compensation transistor M3 in FIG. 5) in the pixel driving circuit 202 to control the light emitting device 201 to emit light.

Specifically, as shown in FIG. 8, for the first stage of gate driving circuit 101 to the sixth stage of gate driving circuit 101, if refresh rates of the first two stages (the first stage to the second stage) of gate driving circuits 101, the intermediate two stages (the third stage to the fourth stage) of gate driving circuits 101, and the last two stages (the fifth stage to the sixth stage) of gate driving circuits 101 are 120 HZ, 60 HZ, and 30 HZ, respectively, it can be seen from the foregoing that, in four consecutive frames (Frame 1 to Frame 4), it may be set as follows: gate control signals NScan(1) to NScan(2) have a valid pulse pl in the Frame 1 to the Frame 4, gate control signals NScan (3) to NScan(4) have the valid pulse pl in the Frame 1 and the Frame 3, and gate control signals NScan(5) to NScan(6) have the valid pulse pl in the Frame 1.

Further, as shown in FIG. 8, the frequency division control signal needs to be set as follows.

The frequency division control signal is the low voltage in the Frame 1 to enable the six control transistors T17 corresponding to the first stage to the sixth stage of gate driving circuits 101 to be turned on, so that the NScan(1) to NScan(6) have the valid pulse pl in the Frame 1.

The frequency division control signal is the low voltage before tf1 in the Frame 1 to enable the two control transistors T17 corresponding to the first stage to the second stage of gate driving circuits 101 to be turned on, so that the NScan(1) to NScan(2) have the valid pulse pl in the Frame 2. Then, the frequency division control signal is the high voltage after the tf1 to enable the four control transistors T17 corresponding to the third stage to the sixth stage of gate driving circuits 101 to be turned off, so that the NScan(3) to NScan(6) have no valid pulse pl in the Frame 2.

The frequency division control signal is the low voltage before tf2 in the Frame 3 to enable the four control transistors T17 corresponding to the first stage to the fourth stage of gate driving circuits 101 to be turned on, so that the NScan(1) to NScan(4) have the valid pulse pl in the Frame 3. Then, the frequency division control signal is the high voltage after the tf2 to enable the two control transistors T17 corresponding to the fifth stage to the sixth stage of gate driving circuits 101 to be turned off, so that the NScan(5) to NScan(6) have no valid pulse pl in the Frame 3.

The frequency division control signal is the low voltage before tf3 in the Frame 4 to enable the two control transistors T17 corresponding to the first stage to the second stage of gate driving circuits 101 to be turned on, so that the NScan(1) to NScan(2) have the valid pulse pl in the Frame 4. Then, the frequency division control signal is the high voltage after the tf3 to enable the fourth control transistors T17 corresponding to the third stage to the sixth stage of gate driving circuits 101 to be turned off, so that the NScan(3) to NScan(6) have no valid pulse pl in the Frame 4.

In summary, as discussed above with respect to FIG. 8, the display panel may be divided into at least a first area, a second area, and a third area. The first area (which is correspondingly applied with the first stage to the second stage of gate driving circuits) is written with data by loading the valid pulse pl in the Frame 1 to the Frame 4 (i.e., four data refreshes are performed). The second area (which is correspondingly applied with the third stage to the fourth stage of gate driving circuits) is written with data by loading the valid pulse pl in the Frame 1 and the Frame 3 (i.e., two data refreshes are performed), that is, the refresh rate in the second area is half of the refresh rate in the first area. Similarly, the third area (which is corresponding applied with the fifth stage to the sixth stage of gate driving circuits) is written with data by only loading the valid pulse pl in the Frame 1 (i.e., one data refresh is performed), that is, the refresh rate in the third area is ¼ of the refresh rate in the first area. In the above example, the refresh rates of the first area, the second area, and the third area may be a, (½)*a, (¼)*a, respectively, where a is an integer multiple of 4, and four frames need to be illustrated. For example, the refresh rates are equal to 120 HZ, 60 HZ, and 30 HZ, respectively.

An example in which the display panel is only divided into three areas, each of the areas is correspondingly applied with two stages of gate control signals, and the refresh rates of the three areas may be a, (½)*a, (¼)*a, respectively is taken for ease of explanation herein. It should be understood by a person skilled in the art that the number of areas divided in the display panel and the number of rows of sub-pixels contained in each of the areas may be varied, and the respective refresh rates may be also adjusted. Only a difference degree of the refresh rates in the plurality of areas and a requirement for setting the number of frames are illustrated herein. If the refresh rate of each latter of the three areas is ⅓ of the refresh rate of its former, nine frames need to be illustrated, so that the refresh times of the three areas are presented in a three times relationship, that is, the three areas are refreshed nine times, three times, and one time, respectively, in the nine frames.

Further, based on m areas, m refresh rates can be expressed as a/(j1), a/(j2), up to a/(jm), where j1 to jm are all positive integers. The m refresh rates are all positive integers, and then the number of frames should be set to the least common multiple of the m numbers from j1 to jm.

Further, a plurality of gate driving circuits 101 are electrically connected to the same clock signal line (it may be considered that all odd stages of gate driving circuits 101 and the first clock signal lines CKL1 or the second clock signal lines CKL2 are connected in the same manner, and all even stages of gate driving circuits 101 and the first clock signal lines CKL1 or the second clock signal lines CKL2 are connected in the same manner, but a connection manner among the odd stages of gate driving circuits 101 and the first clock signal lines CKL1 or the second clock signal lines CKL2 is opposite to that among even stages of gate driving circuits 101 and the first clock signal lines CKL1 or the second clock signal lines CKL2) to load the same clock signal (the first clock signal lines CKL1 and the second clock signal lines CKL 2 are configured to transmit the first clock signal and the second clock signal, respectively). In at least one frame, the frequency division control signal controls each of the i-th stage of gate driving circuit 101 to (i+k)-th stage of gate driving circuit 101 cascaded sequentially, the third node R is disconnected from the first node P or the second node Q corresponding to the third node R (for example, a period in which the frequency division control signal is an invalid high potential in the Frame 2, the Frame 3, and the Frame 4 in FIG. 8), where the i is a positive integer greater than or equal to 2, and the k is a positive integer greater than or equal to 1. In the at least one frame, the clock signal (at least one of the first clock signal and the second clock signal) is a constant voltage signal since the end of the valid pulse of the gate control signal output from the (i−1)-stage of gate driving circuit.

It should be understood that the (i+1)-th stage of gate driving circuit 101 to the (i+k)-th stage of gate driving circuit 101 herein may be understood as a plurality of cascaded second gate driving circuits 1012. An example of one stage of gate driving circuit 101 is taken and may have several configurations as follows.

In case 1, the voltage of the first clock signal is equal to the first voltage VGH (regardless of the setting of the second clock signal), the first clock signal controls the transistors T3, T14, and T4 to be turned off, the second node Q and the node D are maintained at the original (low) voltage, the transistor T8 are turned on at all times to transmit the first voltage VGH to the first node P to turn off the transistor T10, and the transistor T9 is turned on at all times to transmit the VGL to the signal output terminal OUT.

In case 2, the voltage of the first clock signal is equal to the second voltage VGL (regardless of the setting of the second clock signal), the first clock signal controls the transistors T3, T14, and T4 to be turned on, and since the stage transmission signal is always at the low voltage and transmitted to the second node Q and the node D, the transistor T8 is turned on at all times to transmit the first voltage VGH to the first node P to turn off the transistor T10, and T9 is turned on at all time to transmit the VGL to the signal output terminal OUT.

In case 3, the voltage of the second clock signal is equal to the first voltage VGH (regardless of the setting of the first clock signal), the transistor T7 is turned on, regardless of the setting of the first clock signal. That is, the first clock signal is a constant first voltage VGH or a constant second voltage VGL. Alternatively, the voltage of the first clock signal is alternately equal to the first voltage VGH or the second voltage VGL, i.e., the voltage of the first clock signal is equal to the first voltage VGH or the second voltage VGL for any of the periods, which may cause the transistor T10 to be turned off and the transistor T9 to be turned on at all times to transmit the VGL to the signal output terminal OUT in combination with the above discussion.

In summary, since the end of the valid pulse of the gate control signal output from the (i−1)-th stage of gate driving circuit ends, the valid pulse of the (i−1)-th stage of gate control signal has been output normally, and for each of the (i+1)-th stage of gate driving circuit 101 to the (i+k)-th stage of gate driving circuit 101, since the frequency division control signal controls one of the first nodes P to be disconnected from the third node R corresponding to the first node P and various stage transmission signals are low voltages, the output of the gate control signal is not affected even if at least one of the first clock signal and the second clock signal is set as a constant voltage signal. That is, the first stage gate control signal to the (i−1)-th stage gate control signal can output respective valid pulses respectively, and the (i+1)-th stage of gate control signal to the (i+k)-th stage of gate control signal can still output a constant low voltage signal. Since at least one of the first clock signal and the second clock signal is a constant voltage signal, power consumption of the gate driving module 10 can be effectively reduced.

Further, in order to design the clock control signal and minimize power consumption, the clock signals (the first clock signal and the second clock signal) corresponding to each of the i-th stage of gate driving circuit 101 to the (i+k)-th stage of gate driving circuit 101 cascaded sequentially may be set as constant voltage signals. Specifically, reference may be made to FIG. 8.

The present application provides the gate driving module and the display panel. By disposing the frequency division control unit electrically connected between the gate control unit and the output unit and for controlling the signal from one of the first node and the second node according to the frequency division control signal to control the output unit to output the current-stage gate control signal, the plurality of gate control signals respectively generated by the plurality of gate driving circuits are controlled when the gate driving module is applied to the display panel to further control light emitting conditions of a plurality of rows of sub-pixels, so that the plurality of rows of sub-pixels are controlled in different frames to be in different light emitting conditions, resulting in different number of frames in a plurality of frames in which sub-pixels in different areas emit light or do not emit light. That is driving of the display panel in a frequency division manner can be implemented by the same gate driving module. That is, driving of the display panel in a frequency division manner can be implemented.

A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A gate driving module, comprising a frequency division control line and a plurality of cascaded gate driving circuits, wherein the frequency division control line is configured to transmit a frequency division control signal to the plurality of cascaded gate driving circuits, and each of the gate driving circuits comprises:

a gate control unit for receiving a gate control signal generated by an upper stage of gate driving circuit;

an output unit electrically connected to the gate control unit via a first node and a second node and for outputting a current-stage gate control signal based on a signal from the first node and a signal from the second node for transmission to a gate control unit in a lower stage of gate driving circuit; and a frequency division control unit electrically connected between the gate control unit and the output unit and for controlling the signal from one of the first node and the second node based on the frequency division control signal to control the output unit to output the current-stage gate control signal, wherein the frequency division control unit comprises: a control transistor, wherein a gate of the control transistor is electrically connected to the frequency division control line, a source of the control transistor is electrically connected to the gate control unit via a third node, and a drain of the control transistor is electrically connected to the output unit via the first node or the second node, wherein, the frequency division control signal is configured to control the third node to be electrically connected to or disconnected from the first node or the second node, wherein the gate control unit comprises:

a third node control unit electrically connected to a clock signal line and the third node and configured to control a signal from the third node based on a clock signal transmitted via the clock signal line;

a second node control unit electrically connected to the clock signal line and the second node and configured to control the signal from the second node based on the clock signal, or a first node control unit electrically connected to the clock signal line and the first node and configured to control the signal from the first node based on the clock signal; and an input unit, wherein an input terminal of the input unit is electrically connected to the upper stage of gate driving circuit to load the gate control signal generated by the upper stage of gate driving circuit, and an output terminal of the input unit is electrically connected to both the third node control unit and the second node control unit or electrically connected to both the third node control unit and the first node control unit, wherein a drain of the control transistor is electrically connected to the first node, wherein the input unit includes an input transistor, wherein a gate of the input transistor is loaded with the clock signal, a source of the input transistor is configured as the input terminal of the input unit, and a drain of the input transistor is configured as the output terminal of the input unit, wherein the first node control unit comprises a first transistor, a seventh transistor, and a second transistor and a third transistor disposed in series, wherein a gate of the seventh transistor is electrically connected to the drain of the input transistor, a source of the seventh transistor is loaded with the clock signal, a gate of the first transistor is loaded with the clock signal, a source of the first transistor is loaded with the second voltage, a drain of the first transistor is electrically connected to both a gate of the second transistor and a drain of the seventh transistor, both a source of the second transistor and a gate of the third transistor are electrically loaded with the clock signal, a drain of the second transistor is electrically connected to a source of the third transistor, and a drain of the third transistor is electrically connected to the third node, and wherein the second node control unit comprises a fourth transistor, a first capacitor, and a fifth transistor and a sixth transistor disposed in series, wherein a gate of the fourth transistor is loaded with a control signal, a source of the fourth transistor is loaded with the first voltage, a drain of the fourth transistor is electrically connected to the second node, a gate of the fifth transistor is electrically connected to the drain of the first transistor, a source of the fifth transistor is loaded with the first voltage, a drain of the fifth transistor is electrically connected to a source of the sixth transistor, a drain of the sixth transistor is loaded with the clock signal, a gate of the sixth transistor is further loaded with the gate control signal generated by the upper stage of gate driving circuit, and the first capacitor is electrically connected between the gate and the source of the sixth transistor.

2. The gate driving module of claim 1, wherein the output unit comprises:

a first output transistor, wherein a gate of the first output transistor is electrically connected to the first node, a source of the first output transistor is electrically connected to a first voltage line to load a first voltage, and a drain of the first output transistor is electrically connected to a signal output terminal of the gate driving circuit for outputting the current-stage gate control signal; and a second output transistor, wherein a gate of the second output transistor is electrically connected to the second node, a source of the second output transistor is electrically connected to a second voltage line to load a second voltage, and a drain of the second output transistor is electrically connected to the signal output terminal.

3. The gate driving module of claim 2, wherein the gate driving circuit is electrically connected to one or more pixel driving circuits, the signal output terminal is electrically connected to a gate of a pixel transistor in each of the pixel driving circuits, and the first voltage is greater than the second voltage;

wherein the pixel transistor is an N-type transistor, and the drain of the control transistor is electrically connected to the first node; or the pixel transistor is a P-type transistor, and the drain of the control transistor is electrically connected to the second node.

4. The gate driving module of claim 2, wherein the gate control unit comprises:

a third node control unit electrically connected to a clock signal line and the third node and configured to control a signal from the third node based on a clock signal transmitted via the clock signal line;

a second node control unit electrically connected to the clock signal line and the second node and configured to control the signal from the second node based on the clock signal, or a first node control unit electrically connected to the clock signal line and the first node and configured to control the signal from the first node based on the clock signal; and an input unit, wherein an input terminal of the input unit is electrically connected to the upper stage of gate driving circuit to load the gate control signal generated by the upper stage of gate driving circuit, and an output terminal of the input unit is electrically connected to both the third node control unit and the second node control unit or electrically connected to both the third node control unit and the first node control unit.

5. The gate driving module of claim 1, wherein the second node control unit further comprises:

a tenth transistor, wherein a source of the tenth transistor is loaded with the gate control signal generated by the upper stage of gate driving circuit, and a drain of the tenth transistor is electrically connected to the gate of the sixth transistor; and an eleventh transistor, wherein a gate and a source of the eleventh transistor are both electrically connected to the gate of the sixth transistor, and a drain of the eighth transistor is electrically connected to the second node.

6. The gate driving module of claim 1, wherein a plurality of the gate driving circuits are electrically connected to the same clock signal line to load the same clock signal;

in at least one frame, the frequency division control signal controls each of an i-th stage of gate driving circuit to an (i+k)-th stage of gate driving circuit cascaded sequentially, and the third node is disconnected from the first node or the second node corresponding to the third node, wherein i is a positive integer greater than or equal to 2, and k is a positive integer greater than or equal to 1; and wherein, in the at least one frame, the clock signal is a constant voltage signal since the end of the valid pulse of the gate control signal output from the (i−1)-th stage of gate driving circuit.

7. A display panel, comprising:

the gate driving module of claim 1; and a panel body comprising a plurality of sub-pixels and a plurality of scanning lines, wherein each of the sub-pixels comprises a light emitting device and a pixel driving circuit for driving the light emitting device to emit light, and the pixel driving circuit comprises one or more transistors;

wherein the gate control signals output from the gate driving circuits are transmitted to gates of a plurality of the transistors of the plurality of pixel driving circuits via the respective scanning lines.

8. The display panel of claim 7, wherein the output unit comprises:

a first output transistor, wherein a gate of the first output transistor is electrically connected to the first node, a source of the first output transistor is electrically connected to a first voltage line to load a first voltage, and a drain of the first output transistor is electrically connected to a signal output terminal of the gate driving circuit for outputting the current-stage gate control signal; and a second output transistor, wherein a gate of the second output transistor is electrically connected to the second node, a source of the second output transistor is electrically connected to a second voltage line to load a second voltage, and a drain of the second output transistor is electrically connected to the signal output terminal.

9. The display panel of claim 8, wherein the gate driving circuit is electrically connected to one or more pixel driving circuits, the signal output terminal is electrically connected to a gate of a pixel transistor in each of the pixel driving circuits, and the first voltage is greater than the second voltage;

wherein the pixel transistor is an N-type transistor, and the drain of the control transistor is electrically connected to the first node; or the pixel transistor is a P-type transistor, and the drain of the control transistor is electrically connected to the second node.

10. The display panel of claim 7, wherein the second node control unit further comprises:

a tenth transistor, wherein a source of the tenth transistor is loaded with a gate control signal generated by the upper stage of gate driving circuit, and a drain of the tenth transistor is electrically connected to the gate of the sixth transistor; and an eleventh transistor, wherein a gate and a source of the eleventh transistor are both electrically connected to the gate of the sixth transistor, and a drain of the eighth transistor is electrically connected to the second node.

11. The display panel of claim 7, wherein a plurality of the gate driving circuits are electrically connected to the same clock signal line to load the same clock signal;

in at least one frame, the frequency division control signal controls each of an i-th stage of gate driving circuit to an (i+k)-th stage of gate driving circuit cascaded sequentially, and the third node is disconnected from the first node or the second node corresponding to the third node, wherein i is a positive integer greater than or equal to 2, and k is a positive integer greater than or equal to 1; and wherein, in the at least one frame, the clock signal is a constant voltage signal since the end of the valid pulse of the gate control signal output from the (i−1)-th stage of gate driving circuit.

12. The display panel of claim 7, wherein the plurality of cascaded gate driving circuits comprise a plurality of cascaded first gate driving circuits, and a plurality of cascaded second gate driving circuits that are cascaded after the plurality of cascaded first gate driving circuits; and wherein, a plurality of sub-pixels comprise a plurality of first sub-pixels electrically connected to the plurality of first gate driving circuits and a plurality of second sub-pixels electrically connected to the plurality of second gate driving circuits, the plurality of first sub-pixels constitute a first display area, the plurality of second sub-pixels constitute a second display area, and a refresh rate of the first display area is greater than a refresh rate of the second display area.

13. The display panel of claim 7, wherein, in at least one frame, the frequency division control signal is configured to control the gate control signal output from the first gate driving circuit to include a valid pulse to control that the respective one of the light emitting devices emits light and configured to control the gate control signal output from the second gate driving circuit not to include a valid pulse to control respective one of the light emitting devices not to emit light.

14. A display panel, comprising:

the gate driving module of claim 1; and a panel body comprising a plurality of sub-pixels and a plurality of scanning lines, wherein each of the sub-pixels comprises a light emitting device and a pixel driving circuit for driving the light emitting device to emit light, and the pixel driving circuit comprises at least one transistor;

wherein the gate control signals output from the gate driving circuits are transmitted to gates of the transistors of the plurality of pixel driving circuits via the respective scanning;

wherein the plurality of cascaded gate driving circuits comprise a plurality of cascaded first gate driving circuits, and a plurality of cascaded second gate driving circuits that are cascaded after the plurality of cascaded first gate driving circuits;

wherein, the plurality of sub-pixels comprise a plurality of first sub-pixels electrically connected to the plurality of first gate driving circuits and a plurality of second sub-pixels electrically connected to the plurality of second gate driving circuits, the plurality of first sub-pixels constitute a first display area, the plurality of second sub-pixels constitute a second display area, and a refresh rate of the first display area is greater than a refresh rate of the second display area; and wherein, in at least one frame, the frequency division control signal is configured to control the gate control signal output from the first gate driving circuit to include a valid pulse to control that the respective one of the light emitting devices emits light and configured to control the gate control signal output from the second gate driving circuit not to include a valid pulse to control respective one of the light emitting devices not to emit light.

15. A gate driving module, comprising a frequency division control line and a plurality of cascaded gate driving circuits, wherein the frequency division control line is configured to transmit a frequency division control signal to the plurality of cascaded gate driving circuits, and each of the gate driving circuits comprises:

a gate control unit for receiving a gate control signal generated by an upper stage of gate driving circuit;

an output unit electrically connected to the gate control unit via a first node and a second node and for outputting a current-stage gate control signal based on a signal from the first node and a signal from the second node for transmission to a gate control unit in a lower stage of gate driving circuit; and a frequency division control unit electrically connected between the gate control unit and the output unit and for controlling the signal from one of the first node and the second node based on the frequency division control signal to control the output unit to output the current-stage gate control signal, wherein the frequency division control unit comprises: a control transistor, wherein a gate of the control transistor is electrically connected to the frequency division control line, a source of the control transistor is electrically connected to the gate control unit via a third node, and a drain of the control transistor is electrically connected to the output unit via the first node or the second node, wherein, the frequency division control signal is configured to control the third node to be electrically connected to or disconnected from the first node or the second node, wherein the gate control unit comprises:

a third node control unit electrically connected to a clock signal line and the third node and configured to control a signal from the third node based on a clock signal transmitted via the clock signal line;

a second node control unit electrically connected to the clock signal line and the second node and configured to control the signal from the second node based on the clock signal, or a first node control unit electrically connected to the clock signal line and the first node and configured to control the signal from the first node based on the clock signal; and an input unit, wherein an input terminal of the input unit is electrically connected to the upper stage of gate driving circuit to load the gate control signal generated by the upper stage of gate driving circuit, and an output terminal of the input unit is electrically connected to both the third node control unit and the second node control unit or electrically connected to both the third node control unit and the first node control unit, wherein a plurality of the gate driving circuits are electrically connected to the same clock signal line to load the same clock signal, wherein, in at least one frame, the frequency division control signal controls each of an i-th stage of gate driving circuit to an (i+k)-th stage of gate driving circuit cascaded sequentially, and the third node is disconnected from the first node or the second node corresponding to the third node, wherein i is a positive integer greater than or equal to 2, and k is a positive integer greater than or equal to 1, and wherein, in the at least one frame, the clock signal is a constant voltage signal since the end of the valid pulse of the gate control signal output from the (i−1)-th stage of gate driving circuit.

16. A display panel, comprising:

the gate driving module of claim 15; and a panel body comprising a plurality of sub-pixels and a plurality of scanning lines, wherein each of the sub-pixels comprises a light emitting device and a pixel driving circuit for driving the light emitting device to emit light, and the pixel driving circuit comprises one or more transistors;

wherein the gate control signals output from the gate driving circuits are transmitted to gates of a plurality of the transistors of the plurality of pixel driving circuits via the respective scanning lines.

17. A display panel, comprising:

the gate driving module of claim 15; and a panel body comprising a plurality of sub-pixels and a plurality of scanning lines, wherein each of the sub-pixels comprises a light emitting device and a pixel driving circuit for driving the light emitting device to emit light, and the pixel driving circuit comprises at least one transistor;

wherein the gate control signals output from the gate driving circuits are transmitted to gates of the transistors of the plurality of pixel driving circuits via the respective scanning;

wherein the plurality of cascaded gate driving circuits comprise a plurality of cascaded first gate driving circuits, and a plurality of cascaded second gate driving circuits that are cascaded after the plurality of cascaded first gate driving circuits;

wherein, the plurality of sub-pixels comprise a plurality of first sub-pixels electrically connected to the plurality of first gate driving circuits and a plurality of second sub-pixels electrically connected to the plurality of second gate driving circuits, the plurality of first sub-pixels constitute a first display area, the plurality of second sub-pixels constitute a second display area, and a refresh rate of the first display area is greater than a refresh rate of the second display area; and wherein, in at least one frame, the frequency division control signal is configured to control the gate control signal output from the first gate driving circuit to include a valid pulse to control that the respective one of the light emitting devices emits light and configured to control the gate control signal output from the second gate driving circuit not to include a valid pulse to control respective one of the light emitting devices not to emit light.

* * * * *